Aug. 22, 1950     L. W. HERCHENROEDER     2,519,370
SPEED-REGULATED DIRECT-CURRENT DRIVE
Filed March 31, 1948
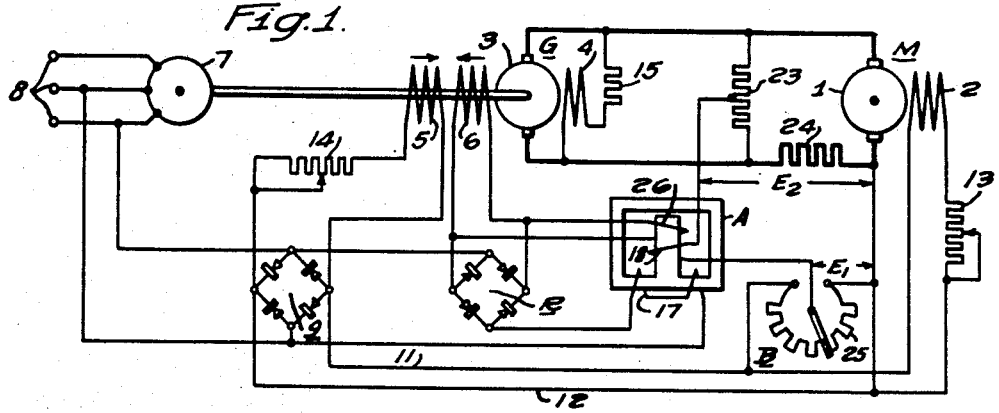
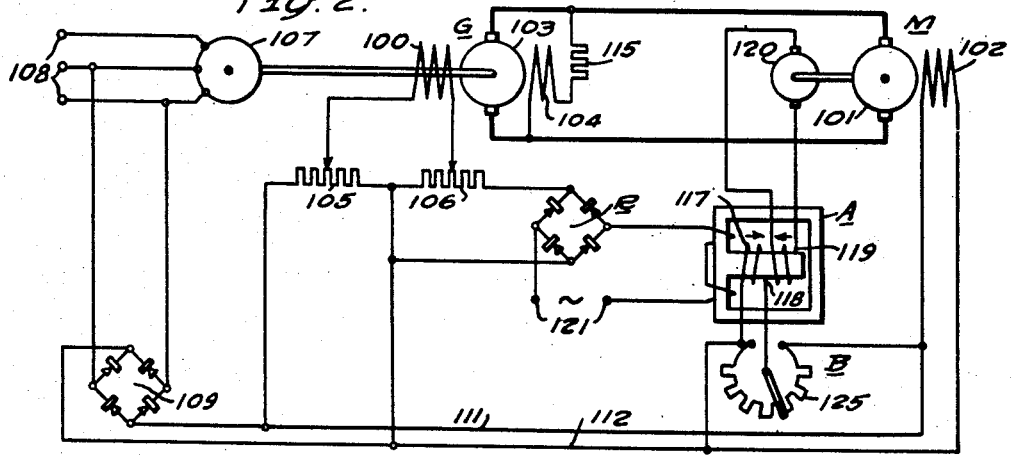
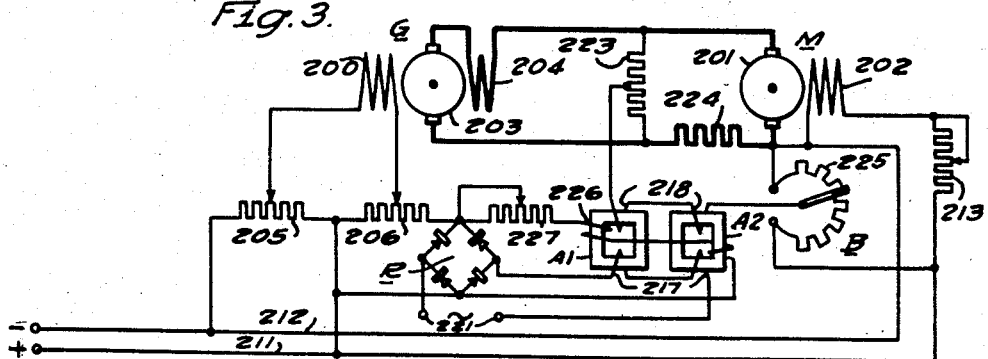
WITNESSES:                                     INVENTOR
                                                LouisW.Herchenroeder.
                                                BY
                                                ATTORNEY Patented Aug. 22, 1950

2,519,370

UNITED STATES PATENT OFFICE 2,519,370

SPEED-REGULATED DIRECT-CURRENT DRIVE

Louis W. Herchenroeder, Pittsburgh, Pa., assignor to Westinghouse Electric Corporation, East Pittsburgh, Pa., a corporation of Pennsylvania Application March 31, 1948, Serial No. 18,129

4 Claims. (Cl. 318—145)

This invention relates to speed-regulated direct-current drives in which a generator energizes a drive motor by adjustable voltage under control by an adjustably excited field of the generator.

It is an object of my invention to provide such an adjustable voltage drive with speed-regulating means capable of maintaining the motor speed at a selected value regardless of the motor load and within a wide range of available speeds, while securing a reliable regulating performance with a minimum of maintenance requirements.

Another object of the invention is to secure a satisfactory and reliable speed control and regulation with the aid of regulating equipment of the static type without foregoing the desirable amplifying performance heretofore conventionally obtained by rotary regulating and amplifying dynamos.

These and other objects of the invention, as well as the means provided by the invention for achieving the desired results, will be apparent from the following description of the embodiments illustrated in the drawing, in which Figs. 1 to 3 exemplify three different direct-current drive systems by respective circuit diagrams. In these figures, the drive motor to be controlled is denoted by M, while G represents a generator for energizing the motor: A (or A1 and A2) denotes a saturable reactance device which in connection with a rectifier R imposes a speed-controlling and regulating effect on the field of the generator; and B denotes a voltage-adjusting means, such as a rheostat, for selectively adjusting the speed to be maintained by the control system.

According to Fig. 1, the armature 1 of motor M receives adjustable direct-current voltage from generator G and has a separately excited field winding 2. The generator G, whose armature is denoted by 3, has three field windings 4, 5, 6 and is driven from a constant speed motor 7 energized from alternating-current terminals 8. Connected to terminal 8 is a rectifier 9 which, in the illustrated example, serves as a source of direct current of substantially constant voltage and feeds the buses 11 and 12.

The motor field winding 2 is connected across buses 11 and 12 through a field rheostat 13 and receives normally constant excitation. The generator field winding 5 is connected across buses 11 and 12 through a calibrating rheostat 14. Field windings 5 and 6 are connected to operate in differential relation to each other. The field winding 6 is excited with a polarity necessary to increase the voltage generated in armature 3 while the excitation of field winding 5 tends to decrease this voltage. The field winding 4 serves to provide self-excitation for the generator G. It is shown to be shunt connected to the armature 3 in series with a calibrating resistor 15. The excitation of field winding 4 is preferably rated so that this field winding provides most of the field excitation required for maintaining the generator voltage at any adjusted value. To this end, the circuit of field winding 4 may be "tuned." That is, the total resistance of the field circuit may be adjusted, for instance by a proper dimensioning of the resistor 15, so that the resistance line coincides approximately with the straight initial portion of the magnetization characteristic of the generator. With such a tuned self-excited field circuit, the two field windings 5 and 6 are merely required to provide the slight additional excitation needed to vary the value of the generator output voltage along the straight portion of its characteristic.

The field winding 6 in generator G is connected across the output terminals of the rectifier R. The input terminals of rectifier R are series-connected with the main winding 17 of the reactor A across the alternating-current terminals 8. The reactor A is shown to have a magnet core of the three-legged type. The turns of the alternating current or main winding 17 are located on the two outer legs of the core while a direct-current control winding 18 is disposed on the center leg. The turn numbers of winding 17 on the respective outer legs are equal and their polarity of connection is such that substantially no secondary voltage is induced in the control winding 18. The reactor core is unsaturated; that is, it operates mainly along the ascending straight portion of its magnetic characteristic. The control winding 18 permits imposing on the core a controllable premagnetization which determines the reactive impedance of the main winding 17 and, therefore, the voltage applied to the alternating-current terminals of the rectifier R. When the control coil 18 is not excited, the reactance of winding 17 is a maximum, the alternating-current voltage impressed on rectifier R is a minimum, and the corresponding rectified voltage impressed on the control field winding 6 of generator G is a minimum. When the control winding 18 of reactor A receives maximum excitation, the reactance of the main reactor winding 17 is a minimum and the rectified voltage impressed on the control field winding 6 a maximum. Consequently, the excitation of control field winding 6 is approximately proportional to the voltage applied to the reactor control winding 18, and a small change in control power applied to winding 18 causes a corresponding highly amplified change of power to occur across the control field winding 6 of the generator.

The control voltage impressed upon the reactor control coil 18 is the resultant of two component voltages which are derived from two differentially related voltage sources. One source is represented by two resistors 23 and 24 which are connected in parallel and in series relation respectively to the armature 1 of motor M. The component voltage $E_2$ tapped off from two series-connected portions of these resistors is substantially proportional to the counter E. M. F. of motor M and, therefore, a measure of the motor speed as long as the motor field remains constant. The other voltage source is represented by a potentiometric rheostat B whose resistor 25 is connected across the direct-current mains 11 and 12. The tapped-off portion of resistor 25 provides a component voltage $E_1$ of a constant magnitude whose value can be adjusted at will by positioning the slider of rheostat B. A feed-back winding 26 is disposed on the center leg of the reactor and connected to the output terminal of rectifier R. Winding 26 provides most of the excitation needed to maintain the reactor at any reactance value within the unsaturated linear portion of its characteristic so that the control winding 18 is only called upon to provide the slight additive or subtractive premagnetizing flux required for changing the reactance toward higher or lower values. In other words, due to the feed-back excitation, the reactor operates as a sensitive amplifier.

In the circuit of the reactor control winding 18, the tapped-off portion of resistor 23 and the resistor 24 are series-connected with the tapped-off portion of resistor 25. The polarity of connection is such that the selected constant component voltage $E_1$ and the speed-responsive and variable component voltage $E_2$ are opposed to each other so that the resultant control voltage applied to the reactor control 18 represents the differential value of the variable and constant components. When the speed of motor M and consequently the speed proportional voltage component $E_2$ has a value which corresponds exactly to the desired motor speed as adjusted by the voltage controlling rheostat B, the differential value of the voltages $E_1$ and $E_2$ has a magnitude at which the field of winding 6 balances that of winding 5 to the extent required to maintain the generator output voltage at the proper value.

If the speed of motor M, for instance, due to a change in load, departs from the desired value, the component voltage $E_2$ changes while the component voltage $E_2$ remains as before. Consequently, the excitation of the reactor control winding 18 changes. This change is amplified and applied to the control field winding 6 of the generator G. As a result, the net field excitation of generator G changes in the direction required to restore or maintain the desired motor speed.

The system permits selecting any motor speed within a wide range merely by changing the adjustment of the speed control rheostat B and it affords a reliable speed regulation independent of load variations without requiring the use of additional rotating machinery for such regulating and control purposes.

In the embodiment shown in Fig. 2, the armature of the motor M is denoted by 101 and in the appertaining field winding by 102. The motor armature 101 is connected in a loop circuit with the armature 103 of the generator G. The generator has a self-excited field winding 104 series-connected with a resistor 115 and is equipped with a control field winding 100 which is connected across two series-related rheostats 105 and 106. The generator armature 103 is driven by a constant speed motor 107 energized from alternating-current terminal 108. A source 109 of constant direct-current voltage is connected through buses 111 and 112 across the motor field winding 102 and also across the rheostat 105. Consequently, a direct-current voltage of an adjusted magnitude appears across the tapped-off portion of rheostat 105 and represents a component field voltage for winding 100. Rheostat 106 is connected across the output terminals of rectifier R in order to provide the circuit of field winding 100 with another component voltage whose value depends upon the alternating voltage effective across the input terminals of rectifier R. The two component field voltages across the tapped off portions of rheostats 105 and 106, respectively, are opposed to each other so that the resultant excitation of generator field winding 100 depends upon their differential value.

The input terminals of rectifier R are connected across alternating-current terminals 121 in series with the main winding 117 of the saturable reactor A which in this embodiment is also exemplified by a device of the three-legged type. The center leg of the reactor is equipped with two mutually differential control windings 118 and 119. Winding 118 is connected across an adjustable portion of the resistor 125 appertaining to the speed adjusting rheostat B. Resistor 125 is connected across the constant voltage buses 111 and 112. Consequently, the constant excitation of control winding 118 has a magnitude dependent upon the selected adjustment of the rheostat B. The control winding 119 is connected to a source of variable voltage which changes in accordance with the speed of motor M. In the embodiment of Fig. 2, this source of variable voltage is represented by a pilot or tachometer generator 120 driven from the motor armature 101.

The control and regulating performance of the system shown in Fig. 2 is basically similar to that of Fig. 1. When the motor speed departs from the one adjusted at rheostat B, the differential excitation of control winding 118 and 119 causes an amplified change in the rectified voltage applied to the rheostat 106. The corresponding change of the field excitation of winding 100 then causes the generator G to vary its output voltage in the direction and to the extent needed to restore the desired motor speed.

In the embodiment shown in Fig. 3, the motor M has its armature 201 energized from the armature 203 of generator G in series with a self-excited generator field 204. The motor field winding 202 is connected through a field rheostat 213 to constant voltage buses 211 and 212. The generator G has a control field winding 200 energized from two series-opposed voltage sources represented by rheostats 205 and 206, respectively. Rheostat 205 is connected across the constant voltage buses 211 and 212 in order to provide a normally constant, though adjustable, component of field excitation. Rheostat 206 is connected across the output terminals of the rectifier R in order to provide a field component of variable magnitude dependent upon the speed of motor M. The input terminals of rectifier R are connected to alternating-current terminals 221 in series with the main winding 217 of a saturable reactance device which, in this embodiment, is designed as two interconnected individual reactors A1 and A2 each having a separate magnetic circuit. The winding 217 is duplicated on both reactor cores and the two parts are series-connected with each other. Both reactor cores also carry a control winding 218 and a feed-back winding 226. The numbers of turns of the control winding 218 on the respective reactor cores and the polarity of interconnection are such that the alternating voltage induced in the winding turns on reactor A1 substantially cancels the voltage induced in the turns on reactor A2. The numbers of turns and the poling of the feed-back winding 226 on the respective reactor cores are likewise such as to prevent the occurrence of a secondary alternating voltage across the feed-back winding. The feed-back winding is connected across the output terminals of the rectifier R, in series with a calibrating resistor 227.

The control winding 218 of the reactance device is differentially excited from two series-opposed voltage sources of which one provides a variable voltage component responding to the motor speed while the other provides a normally constant component of adjustable magnitude. As in the embodiment of Fig. 1, the source of a variable and speed-responsive voltage consists of two resistors 223 and 224 so connected with the motor armature circuit and with each other as to provide a voltage drop substantially proportional to the counter E. M. F. of motor M. The source of constant and adjustable voltage is represented by a speed adjusting rheostat B whose resistor 225 is connected across the constant voltage buses 211 and 212. The performance of the system, according to Fig. 3, is basically similar to that of the system, according to Fig. 1.

It will be recognized by those skilled in the art that systems according to the invention can be modified as regards various circuit components and connections and may be embodied in designs other than those specifically shown and described in this disclosure, without departing from the objects, advantages and essential features of the invention and within the scope of the claims annexed hereto.

I claim as my invention:

1. A variable-voltage drive, comprising a direct-current motor and a generator having a common armature circuit, said generator having a self-excited field winding to provide most of its normal excitation and having separately excited field means for controlling said excitation, alternating-current supply means, a controlled saturable reactor, a rectifier having an output circuit connected to said control field means and having an input circuit connected in series with said reactor to said supply means, said reactor having a feed-back winding connected with said rectifier output circuit to provide most of the control excitation of said reactor and having a single control winding for controlling said latter excitation, variable-voltage means connected to and controlled by said motor and attached to said control winding to excite it in dependence upon the motor speed, and constant-voltage means connected with said control winding in series-opposed relation to said variable-voltage means and having selectively adjustable voltage control means for determining the motor speed.

2. A variable-voltage drive, comprising a direct-current motor and a generator having a common armature circuit, said generator having a self-excited field winding to provide most of its normal excitation and having a control field winding for controlling said excitation, direct-current supply means of normally constant voltage connected to said control field winding, alternating-current supply means, a controlled saturable reactor, a rectifier having an output circuit connected to said control field means in series-opposition to said direct-current supply means and having an input circuit connected in series with said reactor to said supply means, said reactor having a feed-back winding connected with said rectifier output circuit to provide most of the control excitation of said reactor and having a control winding for controlling said latter excitation, variable-voltage means connected to and controlled by said motor and attached to said control winding to excite it in dependence upon the motor speed, and constant-voltage means connected with said control winding in series-opposed relation to said variable-voltage means and having selectively adjustable voltage control means for determining the motor speed.

3. In combination, a dynamo-electric machine having a self-excited field winding to provide most of its normal excitation and having separately excited field means for controlling said excitation, alternating-current supply means, a controlled saturable reactor, a rectifier having an output circuit connected to said control field means and having an input circuit connected in series with said reactor to said supply means, said reactor having a feed-back winding connected with said rectifier output circuit to provide most of the control excitation of said reactor and having a single control winding for controlling said latter excitation, constant-voltage means connected with said control winding and having selectively adjustable voltage control means for setting a desired operational magnitude for said machine, and variable-voltage means connected with said machine to be controlled by said magnitude and connected with said control winding in series-opposition to said constant voltage means.

4. In combination, a dynamo-electric machine having a self-excited field winding to provide most of its field excitation and a control field winding for controlling said excitation, direct-current supply means of normally constant voltage connected to said control field winding, alternating-current supply means, a controlled saturable reactor, a rectifier having an output circuit connected to said control field means in series-opposition to said direct-current supply means and having an input circuit connected in series with said reactor to said supply means, said reactor having a feed-back winding connected with said rectifier output circuit to provide most of the control excitation of said reactor and having a control winding for controlling said latter excitation, constant-voltage means connected with said control winding and having selectively adjustable voltage control means for setting a desired operational magnitude for said machine, and variable-voltage means connected with said machine to be controlled by said magnitude and connected with said control winding in series-opposition to said constant-voltage means.

LOUIS W. HERCHENROEDER.

REFERENCES CITED

The following references are of record in the file of this patent:

UNITED STATES PATENTS

| Number | Name | Date |
|---|---|---|
| 2,121,588 | Eames | June 21, 1938 |
| 2,286,370 | Miller | June 16, 1942 |
| 2,389,367 | King | Nov. 20, 1945 |

FOREIGN PATENTS

| Number | Country | Date |
|---|---|---|
| 361,984 | Italy | Aug. 9, 1938 |